US006771091B2

(12) United States Patent
Lagowski et al.

(10) Patent No.: US 6,771,091 B2
(45) Date of Patent: Aug. 3, 2004

(54) METHOD AND SYSTEM FOR ELEVATED TEMPERATURE MEASUREMENT WITH PROBES DESIGNED FOR ROOM TEMPERATURE MEASUREMENT

(75) Inventors: Jacek J. Lagowski, Tampa, FL (US); Piotr Edelman, Tampa, FL (US); Frank Gossett, Palm Harbor, FL (US); Nick Kochey, St. Petersburg, FL (US); Alexandre Savtchouk, Tampa, FL (US)

(73) Assignee: Semiconductor Diagnostics, Inc., Tampa, FL (US)

( * ) Notice: Subject to any disclaimer, the term of this patent is extended or adjusted under 35 U.S.C. 154(b) by 81 days.

(21) Appl. No.: 10/253,180

(22) Filed: Sep. 24, 2002

(65) Prior Publication Data

US 2004/0057497 A1 Mar. 25, 2004

(51) Int. Cl.$^7$ ............................................. G01R 31/26
(52) U.S. Cl. ....................... 324/765; 324/750; 324/767; 250/492.2
(58) Field of Search ................................ 324/750, 751, 324/752, 754, 765, 766, 767; 250/492.2

(56) References Cited

U.S. PATENT DOCUMENTS

| 5,498,974 A | | 3/1996 | Verkuil et al. ............... 324/767 |
| 5,773,989 A | | 6/1998 | Edelman et al. ............. 324/765 |
| 5,977,788 A | * | 11/1999 | Lagowski .................... 324/765 |
| 6,011,404 A | | 1/2000 | Ma et al. ..................... 324/765 |
| 6,202,029 B1 | * | 3/2001 | Verkuil et al. ................ 702/64 |
| 6,265,890 B1 | * | 7/2001 | Chacon et al. ............... 324/765 |

OTHER PUBLICATIONS

Modular Series on Solid State Devices, vol. 1 "Semiconductor Fundamentals" by Robert F. Pierret, Jul. 1983 (pp. 46–53).*
"Defect Recognition and Image Processing in Semiconductors 1977," Proceedings of the Seventh International Conference on Defect Recognition and Image Processing in Semiconductors (DRIP VII) held in Templin, Germany, Sep. 7–10, Edited by J. Donecker and I. Rechenberg p. 131–140.
Schroder, Kieter K., "Contactless surface charge semiconductor characterization," Materials Science and Engineering B91–92, P. 196–210, 2002.
"Electrets," Third Edition in Two vols., vol. 1, Edited by G.M. Sessler , C. 1998.

* cited by examiner

Primary Examiner—David A. Zarneke
Assistant Examiner—Paresh Patel
(74) Attorney, Agent, or Firm—Fish & Richardson P.C.

(57) ABSTRACT

Techniques for measuring a contact potential difference of a sample at an elevated temperature using a probe designed for room temperature measurement are disclosed. In such measurements, probe damage by excessive heating can be prevented without any probe modifications to include probe cooling. This can be achieved by minimizing the time the probe spends in close proximity to the heated sample. Furthermore, the effect of probe heating by the sample on the probe reading can be corrected by including an additional contact potential difference measurement of a reference plate kept at room temperature in the measurement cycle.

20 Claims, 5 Drawing Sheets

US 6,771,091 B2

METHOD AND SYSTEM FOR ELEVATED TEMPERATURE MEASUREMENT WITH PROBES DESIGNED FOR ROOM TEMPERATURE MEASUREMENT

TECHNICAL FIELD

This invention relates to measuring contact potential differences.

BACKGROUND

A contact potential difference (CPD) is a difference between an electrostatic potential at a surface of a sample and a contact potential of a metal electrode of a CPD probe, which is determined by the probe electrode's work function. CPD measurements are non-contact measurements that are particularly useful for characterizing numerous structures extensively used in semiconductor electronics, such as dielectric layers disposed on semiconductor substrates. Examples of these applications are described by J. Lagowski and P. Edelman in "Contact Potential Difference Methods for Full Wafer Characterization of Oxidized Silicon," Inst. Phys. Conf., Ser. No. 160, p. 133–144 (1997), and by D. K. Schroder in "Contactless Surface Charge Semiconductor Characterization," Material Science and Engineering, B91–92, p. 196–210 (2002). In cases where the sample is a dielectric film on a semiconductor substrate the contact potential difference of the sample, $V_{CPDS}$, can be expressed as:

$$V_{CPDS} = V_S - \phi_{el},$$

where $\phi_{el}$ is the contact potential of the CPD probe electrode and $V_S$ is the sample surface potential:

$$V_S = V_{diel} + V_{SB} + \phi_s.$$

Here, $V_{diel}$ is the potential drop across the dielectric layer, $V_{SB}$ is the semiconductor surface barrier, and $\phi_s$ is the contact potential corresponding to the semiconductor work function at the flatband condition (i.e., when $V_{SB}=0$).

Electrical charge residing in a dielectric layer, on the surface of the dielectric layer, or at the interface between the dielectric layer and the semiconductor substrate can be monitored by measuring a change in a $V_{CPDS}$ in response to an electric charge, $\Delta Q$, intentionally placed on the dielectric layer's surface, for example, by a corona discharge in air. This change in $V_{CPDS}$, can be expressed as:

$$\Delta V_{CPDS} = \Delta V_{diel} + \Delta V_{SB},$$

where $\Delta V_{diel} = \Delta Q/C_{diel}$, $C_{diel}$ being the dielectric layer capacitance. $\Delta V_{SB} = \Delta Q/(C_{SC} + C_{it})$, where $C_{SC}$ and $C_{it}$ are the capacitance of the semiconductor space charge and interface traps, respectively.

Electrical current in the dielectric layer can also be monitored by measuring a rate of change of $V_{CPDS}$, after corona charging of dielectric, $dV_{CPDS}/dt$. In this type of measurement, $V_{CPDS}$ is recorded as a function of time. A current, J, is obtained from the rate of change of the voltage across the dielectric layer, $V_{diel}$:

$$J = C_{diel} \frac{dV_{diel}}{dt} \approx C_{diel} \frac{dV_{CPDS}}{dt}.$$

Key properties of dielectrics (e.g., electrical conductance, charge trapping) important for semiconductor device functioning are temperature dependent. Therefore, characterization of dielectrics would clearly benefit if CPD could be measured over wide temperature range including elevated temperature as high as 400° C. or even 500° C.

SUMMARY

Typical CPD probes incorporate elements such as a measuring electrode, an operational FET preamplifier, an electromagnetic or piezoelectric vibrator, soldered electric wires, elements connected with glue or epoxy. These elements can be affected, or even destroyed, by elevated temperature. For example, currently manufactured probes would generally fail at temperatures in excess of 400° C.

Measurement systems can be designed to avoid overheating of the probe during measurement of samples at elevated temperature, without any modification of the probe assembly and without a need for probe cooling devices that would stabilize the probe temperature during a measurement of hot samples. To avoid overheating, the probe is cycled between two positions: a room temperature position in the proximity of a reference plate; and a "hot" position in the proximity of sample at elevated temperature. The cycle can be asymmetric in time. For example, for the majority of a typical cycle lasting about 15 seconds, the probe is in a room temperature position. The time the probe spends in this position (e.g., about 10 seconds) is referred to as resting time $\Delta t_{rest}$. For a short portion of the cycle (e.g., about 2 seconds), referred to as measuring time, $\Delta t_{measure}$, the probe is in the proximity of the sample at elevated temperature. This cycle limits the heating of the probe while it measures the sample and helps to cool the probe back to a room temperature while the probe is in the proximity of a reference plate.

When the sample is at high temperature, such as 400° C. or 500° C., a noticeable heating of the probe can take place even during a short 2-second sample measuring time. This can alter the contact potential, $\phi_{el}$, of the probe electrode, and change the probe reading of the sample $V_{CPDS} = V_S - \phi_{el}$. The present method makes the sample measurements substantially independent of changes in $\phi_{el}$. In other words, the described method provides compensation for any changes in $\phi_{el}$ that may occur due to probe heating. This is done using two measurements: the contact potential of the sample $V_{CPDS} = V_S - \phi_{el}$, which is measured with the probe positions in the proximity of the sample; and, the measurement of a reference plate that is done immediately after returning of the probe to position in the proximity of a reference plate. The second measurement provides $V_{CPDR} = \phi_{ref} - \phi_{el}$, where $\phi_{ref}$ is the contact potential of the reference plate. From these two measurements a difference is obtained $\Delta V_{CPD} = V_{CPDS} - V_{CPDR} = V_S - \phi_{ref}$, $\phi_{ref}$ is constant because the reference plate is kept at a constant reference temperature (e.g., typically room temperature). Thus, $\Delta V_{CPD}$ provides an accurate measure of the sample contact potential, $V_S$, that is not substantially affected by any changes in $\phi_{el}$.

While the described methods and systems focus on elevated temperature measurement done with CPD probes, it shall be pointed out that the methods can be applied to measurement with any non-contact probe that may be affected by exposure to elevated temperature. Such probes may include, for example, photovoltaic probes for the surface photovoltage measurement, or optical probes for probing light reflected from the sample or emitted by the sample.

In general, in a first aspect, the invention features a method for elevated sample temperature measurement. The method includes heating a sample to a sample temperature, T, and moving a probe from a first position to a second position, wherein the first position is proximate to a reference plate held at constant temperature, $T_0$, and the second position is proximate to the sample, and T is greater than $T_0$. The method further includes measuring a contact potential difference of the sample, $V_{CPDS}$, with the probe being held in the second position for a measuring time, $\Delta t_{measure}$, sufficiently short to prevent substantial heating of the probe. The method also includes returning the probe to the first position, measuring a contact potential difference of the reference plate, $V_{CPDR}$, and determining a difference $\Delta V_{CPD} = V_{CPDS} - V_{CPDR}$ as a measure of a sample contact potential at T.

Implementations of the method can include one or more of the following features.

The probe need not be actively cooled while in the second position. $\Delta t_{measure}$ can be 2 seconds or less.

The method can further include holding the probe in the first position for a probe resting period, $\Delta t_{rest}$, of 5 seconds or more after returning the probe to the first position.

$T_0$ can be less than 100° C. (e.g., less than 80° C., less than 50° C., less than 30° C., less than 25° C., such as 23° C.). During the measurement of $V_{CPDS}$ and $V_{CPDR}$, the temperature of the probe can be kept within 5° C. of $T_0$ (e.g., within 3° C. of $T_0$, within 2° C. of $T_0$, within 1° C. of $T_0$). The sample temperature T can be between $T_0$ and 500° C.

The sample can include a dielectric layer. The reference plate can include gold or platinum.

The method can also include cycling the probe between the first position and the second position, and during each cycle, measuring $V_{CPDS}$ in the second position and $V_{CPDR}$ in the first position, and determining a sample contact potential difference from a difference between $V_{CPDS}$ and $V_{CPDR}$ from each cycle. In some embodiments, the method can also include changing the sample temperature between measuring $V_{CPDS}$ of successive cycles and measuring the sample temperature, T, each time the probe measures $V_{CPDS}$. Alternatively, or additionally, the method can further include determining a dependence of A $V_{CPD}$ on the sample temperature. A corona charge can be deposited on sample surface prior to changing the sample temperature.

Once the system acquires data from cycling the probe between the first and second positions, the method can include characterizing the sample in one or more ways. For example, the method can include identifying contaminant ions present in the sample from the dependence of $\Delta V_{CPD}$ on the sample temperature. Alternatively, or additionally, the method can include determining the concentration of each contaminant ion in the sample from the dependence of $\Delta V_{CPD}$ on the sample temperature. As another example, the method can include monitoring desorption of contaminants from the sample from a rate of change of the dependence of $\Delta V_{CPD}$ on the sample temperature.

In a second aspect, the invention features a system, including a sample stage for supporting a sample, a heating element for heating the sample to a sample temperature, a reference, a probe for making contact potential difference measurements mounted on a probe arm, and an electronic controller, which during operation causes the probe arm to position the probe relative the sample to measure a contact potential difference between the probe and the sample, and then causes the probe arm to position the probe relative to the reference and to measure a second contact potential difference between the probe and the reference.

The system can be adapted to implement the methods of other aspects of the invention. The system can also include one or more of the following features.

The system can include a cooling element positioned relative the reference sample, and during operation, the cooling element can stabilize the reference plate temperature. The probe can be a Kelvin probe, a Monroe probe, or a Trek probe.

In a third aspect, the invention features a method, including moving a probe at a first temperature from a first position to a second position, wherein the first position is proximate to a reference at the first temperature and the second position is proximate to a sample, the sample being heated to a sample temperature greater than the first temperate, measuring a first contact potential difference of the sample with the probe in the second position, returning the probe to the first position, and measuring a second contact potential difference of the reference, wherein the probe is held in the second position for a period wherein the probe's temperature is substantially unchanged from the first temperature during the measuring.

Implementations of the method can include any of the features of the other aspects of the invention.

In a fourth aspect, the invention features a method, including moving a probe at a first temperature from a first position to a second position, wherein the first position is proximate to a reference at the first temperature and the second position is proximate to a sample, the sample being heated to a sample temperature greater than the first temperate, measuring a first contact potential difference of the sample with the probe in the second position, and removing the probe from the second position. The probe is held in the second position for a sufficiently short time so that the probe's temperature is substantially unchanged from the first temperature during the measuring.

Implementations of the method can include any of the features described in regard to other aspects of the invention. Implementations of the method can also include one or more of the following features.

The method can include measuring a second contact potential difference of the reference with the probe in the first position. Additionally, the method can include determining the sample contact potential difference from the first and second contact potential differences.

After positioning the probe in the first position, the first contact potential difference can be measured before the sample can substantially heat the probe.

The method can also include returning the probe to the first position after removing the probe from the second position.

Note that substantial heating of the probe includes any heating that would damage the probe and/or cause errors in the measurement that could not easily be corrected for to provide measurements within the desired accuracy of the particular application (e.g., errors that are not corrected for by the methods disclosed herein). Substantial heating can include, for example, heating that would change the probe temperature more than 10° C. from $T_0$.

Embodiments of the invention can include one or more of the following advantages.

Commercial CPD probes designed for operation at or near room temperature (e.g., between 20° C. and 25° C.) can be used without any modification while measuring samples at elevated temperatures (e.g., more than 100° C., such as more than 200° C., 300° C., 400° C., or even 500° C.). Effects of probe heating on the CPD measurements can be corrected for using a reference measurement, providing precise CPD measurements of samples at elevated temperatures.

The measurement techniques enable CPD characterization of samples as a function of sample temperature. For example, these techniques can be used to monitor electrical current in a dielectric as a function of temperature. Transport of ionic contaminants in a dielectric can also be monitored. The temperature dependence of contaminant transport can be used to determine the type and concentration of the contaminant.

Unless otherwise defined, all technical and scientific terms used herein have the same meaning as commonly understood by one of ordinary skill in the art to which this invention belongs. Although methods and apparatus similar or equivalent to those described herein can be used in the practice or testing of the present invention, suitable methods and apparatus are described below. All publications, patent applications, patents, and other references mentioned herein are incorporated by reference in their entirety. In case of conflict, the present specification, including definitions, will control. In addition, the apparatus, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

At least in part, the invention is related to measuring a contact potential difference of a sample at elevated temperatures (e.g., temperatures about 500° C.).

Figure 1:
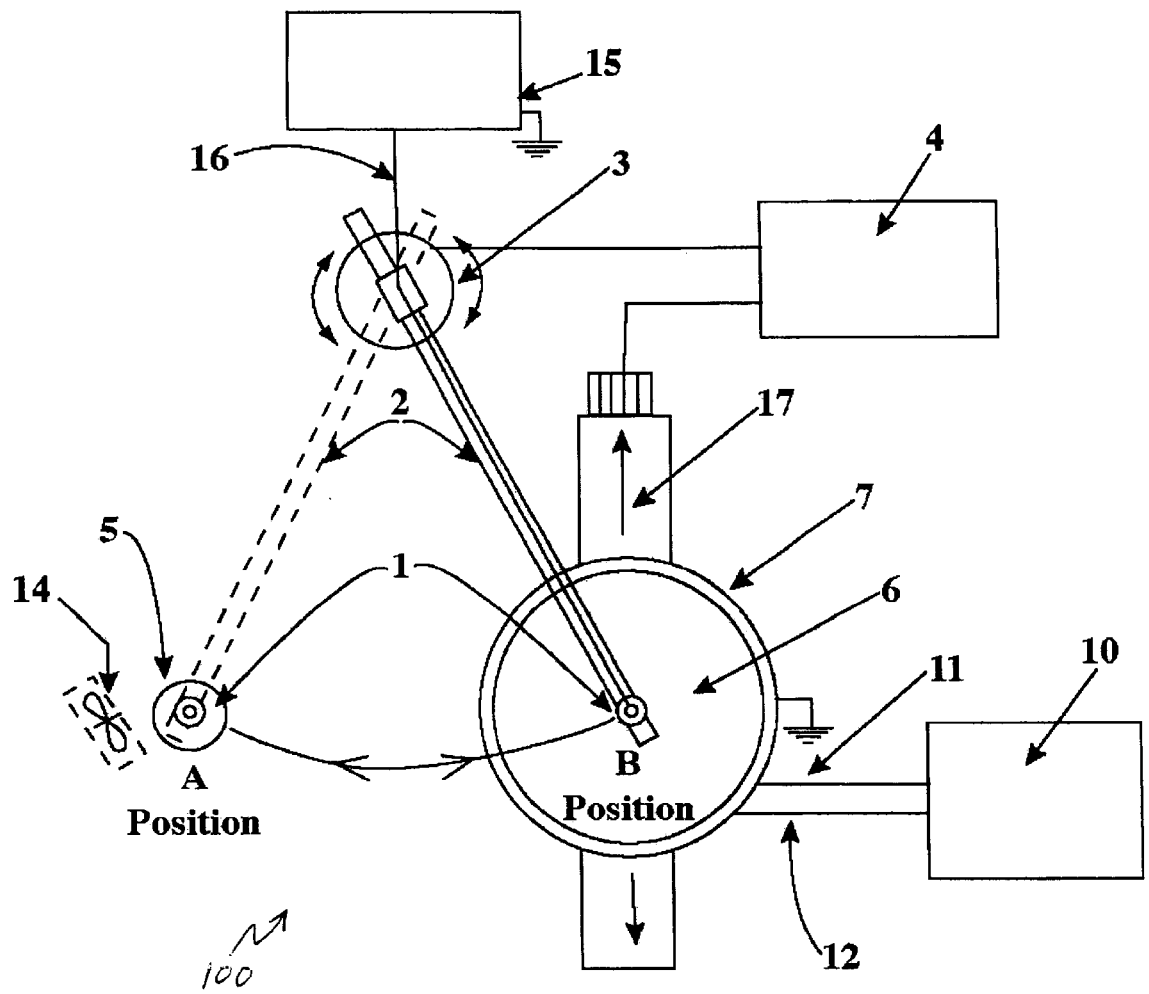
FIG. 1 is a plan view schematic of an apparatus for elevated temperature measurement of contact potential difference.
Figure 2:
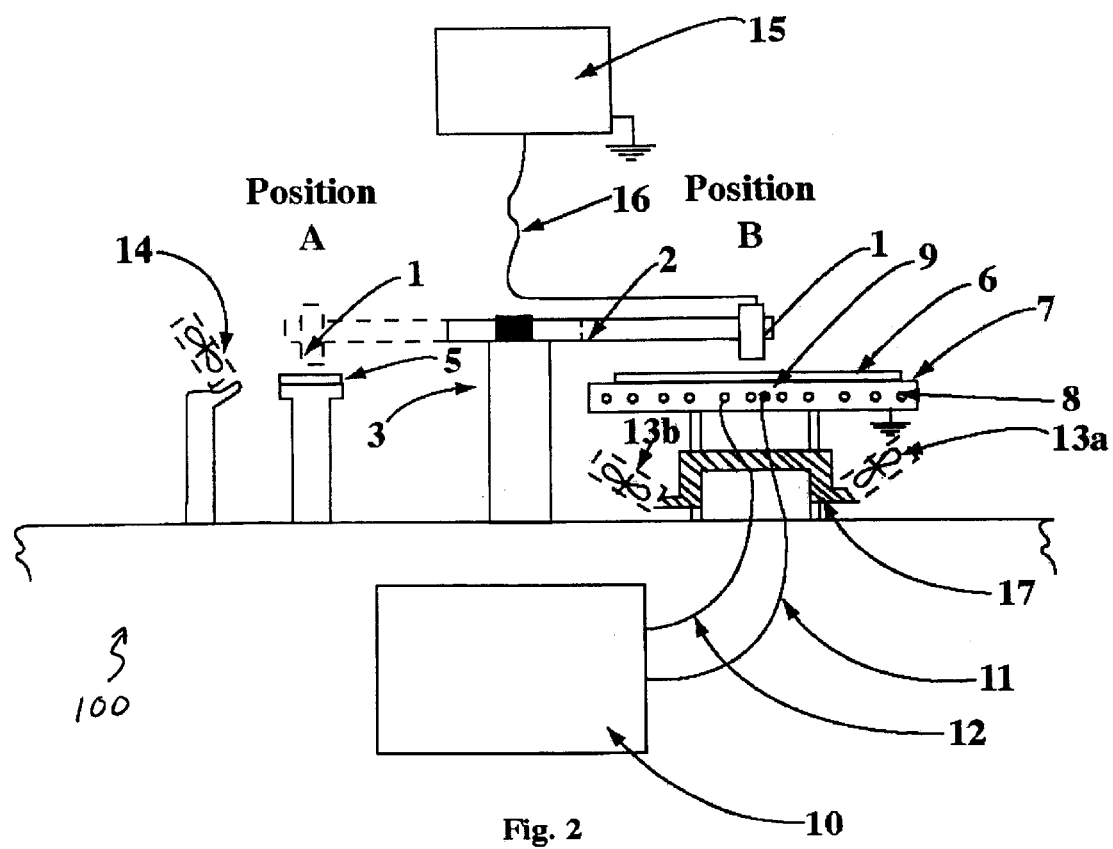
FIG. 2 is a side view schematic of the apparatus shown in FIG. 1.

Referring to FIG. 1 and FIG. 2, a system 100 includes a contact potential difference (CPD) probe 1 mounted on a rotating arm 2. A CPD probe controller and meter 15 and a motion controller 4 that moves rotating arm 2 with CPD probe 1. On command from motion controller 4, a motorized rotating stage 3 (or equivalent pneumatic rotating stage) moves rotating arm 2 to position CPD probe 1 back and forth between a first position A and a second position B.

In first position A, CPD probe 1 is positioned above a reference plate 5 and measures a contact potential difference between probe 1 and reference plate 5. Reference plate 5 is a plate of material that provides a stable value of contact potential, $\phi_{ref}$ that is not substantially affected by ambient changes (e.g., changes in humidity). For example, noble metals, such as high purity platinum or gold, are suitable materials for reference plate 5. Reference plate 5 is electrically grounded and maintained at a reference temperature, $T_0$ (e.g., at room temperature), by a fan 14.

In second position B, CPD probe is positioned above a sample 6 and measures a CPD between a reference electrode of probe 1 and sample 6. CPD probe controller and meter 15 records the measured CPD in each position. The substrate of sample 6 is electrically grounded and supported by a variable temperature hot chuck 7, which heats sample 6 to an elevated temperature, T (e.g., to 500° C.). Hot chuck 7 is mounted on a translation stage 17, which is controlled by motion controller 4. Translation stage 17 moves sample 6 relative to probe 1 in position B, enabling system 100 to measure a sample CPD at multiple positions on sample 6. A temperature sensor 9 monitors the temperature of hot chuck 7, which is approximately the same as the temperature of sample 6. Temperature sensor 9 communicates with a temperature controller 10 via signal line 11. Based on signal line 11, temperature controller 10 adjusts the temperature and rate of change of the temperature of hot chuck 7 by adjusting a power level sent via a cable 12 to a heating element 8. Cooling fans 13a and 13b assist the cooling of heat chuck 7, for example, when a measurement procedure needs temperature T reduced.

A computer (not shown) controls motion controller 4, CPD probe controller and meter 15, and temperature controller 10, and coordinates measurement sequences. The computer records data from CPD probe controller and meter 15 and temperature controller 10, and performs additional analysis on the recorded data, which will be discussed in detail below.

During a typical measurement sequence, rotating arm 2 cycles probe 1 back and forth between position A and position B. During each cycle, probe 1 measures a reference CPD, $V_{CPDR}$, and a sample CPD, $V_{CPDS}$, in position A and position B, respectively. While the temperature of reference plate 5 is maintained at reference temperature $T_0$, hot chuck 7 and/or fans 13a and 13b vary the temperature of sample 6 between successive measurements. As the sample temperature is typically elevated with respect to $T_0$, sample 6 heats probe 1 via radiation and convection when in position A. To reduce this heating well below the probe damage threshold, the time probe 1 spends in position B (i.e., the measuring time, $\Delta t_{measure}$) during each measurement cycle is as short as possible, (e.g., 5 second or less, 2 seconds or less). On the other hand, the time that probe 1 spends in position A (i.e., the resting time, $\Delta t_{rest}$) is longer to promote cooling of the probe. For example, the resting time can be more than 8 seconds, such as 10 seconds or more. In some embodiments, a typical measurement sequence lasts about 15 seconds: 1.5 seconds to move probe 1 from position A to position B; 1 second to measure $V_{CPDS}$; 1.5 seconds to move from position B to position A; 1 second to measure $V_{CPDR}$ and the rest of the 9 seconds to cool probe 1 in position A.

Figure 3:
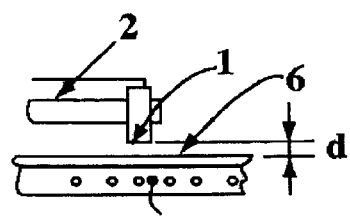
FIG. 3 is a schematic of contact potential difference probe of FIG. 1 positioned above a sample.

Referring to FIG. 3, when in position B a distance, d, separates probe 1 from a top surface of sample 6. Distance d is sufficiently large to prevent heat damage to probe 1 by sample 6 during a measurement cycle (e.g., at least 0.2 mm, such as 0.5 mm or more). Accordingly, distance d depends on the type of probe, the temperature of the sample, and the length of time the probe is held in position B to make a measurement. A distance of 1 mm, for example, is sufficient to prevent thermal damage to a commercial Monroe CPD probe (e.g., a 1017 Isoprobe from Monroe Electronics, Lydonville, N.Y.) by a sample heated to 450° C. during a CPD measurement with $\Delta t_{measure}=2$ seconds and $\Delta t_{rest}=10$ seconds.

While no damage occurs to probe 1 during the measurement cycle, exposure of probe 1 to hot air above the sample, while in position B, can affect the accuracy of CPD measurements. For example, hot air can cause desorption of polar water molecules from an electrode of probe 1, which can change the contact potential of the probe electrode $\phi_{el}$. However, effects of this heating on the probe reading are compensated using the reference plate CPD, $V_{CPDR}$. For this purpose, a $V_{CPDR}$ is measured immediately after probe 1 returns to position A after making a $V_{CPDS}$ measurement of the heated sample. During data analysis, a difference $V_{CPDS}-V_{CPDR}$ is used, rather than $V_{CPDS}=V_S-\phi_{el}$. Note that $\Delta V_{CPD}=V_{CPDS-VCPDR}=V_S-\phi_{ref}$ and thus $V_{CPD}$ it is not affected by changes in $\phi_{el}$.

In a measurement that uses multiple sample temperatures ranging from $T_1$ to $T_2$ (for example when the sample temperature is ramped from $T_1=25°$ C. to $T_2=400°$ C.), $\Delta V_{CPD}$ corresponding to any particular temperature Tin that range is determined from corresponding values of $V_{CPDS}$ and $V_{CPDR}$. Further data analysis is performed using the data $V_{CPD}$ (T). The sample temperature T is measured when the probe is in the position B.

Probe 1 can be a commercially available CPD probe, such as a Kelvin probe, a Monroe probe, or a Trek probe. These probes include a measuring electrode, typically formed from a gold plate, or a gold-plated metal plate. During a CPD measurement, a capacitance between the electrode and a sample is varied by periodic vibrations in the probe. In a Kelvin probe, for example, these vibrations cause the distance between the probe electrode and the sample surface to vary. In a Monroe probe, the probe includes a tuning fork between the probe electrode and the sample. During operation, the tuning fork vibrates, thereby varying the probe capacitance. These vibrations cause a current signal in the probe, which is proportional to the rate of change of the capacitance and is given by:

$$J = \frac{dC}{dt}(V_{CPD} + V_{bias}),$$

where $V_{bias}$ is the bias voltage applied between the probe electrode and the sample by CPD probe controller and meter 15 via electric cable 16. $V_{CPD}$ is determined from current J by calibrating the current with a known bias voltage or by measuring the bias voltage that produces J=0. In this latter method, known as the compensation method, $V_{CPD}=-V_{bias}$ at J=0. Commercial meters perform automatic compensation, providing a $V_{CPD}$ measurement in times as short as 0.1 second.

In some embodiments, system 100 can be used as an ion drift spectrometer. In these applications, $V_{CPDS}$ data measured as a function of temperature are used to identify mobile ion contaminants (e.g., $Na^+$, $Li^+$, $Cu^+$, and/or $K^+$) in a dielectric film in a sample (e.g., in a $SiO_2$ film on a silicon substrate). The concentration of these contaminants can also be determined from the $V_{CPDS}$ vs. temperature data.

A typical ion-drift spectrometry characterization of an $SiO_2$ film on a silicon substrate is as follows. In preparation, a positive charge is placed on a surface of the $SiO_2$ film at room temperature using corona discharge in air. Large positive corona ions $(H_2O)nH^+$ deposited on the $SiO_2$ surface create an electric field within the $SiO_2$ film. These ions do not typically move into $SiO_2$ even at elevated temperature. The user then places the charged sample on variable temperature hot chuck 7 and begins the measurement sequence. During the measurement sequence, the chuck temperature is ramped up at a constant rate, and the probe is cycled between position A and position B where it measures $V_{CPDS}$ and $V_{CPDR}$, respectively. Accordingly, the CPD meter acquires a series of $V_{CPDS}$ and $V_{CPDR}$ measurements as a function of chuck temperature. The temperature increment between each measurement depends on the timing of probe cycling and the temperature ramp rate. For example, measurements are made at 2.5° C. increments for a 15 second probe cycling period and a ramp rate of 10° C. per minute. The computer determines $\Delta V_{CPD}=V_{CPDS}-V_{CPDR}$ as a function of temperature from the acquired $V_{CPDS}$ and $V_{CPDR}$ data.

Figure 4:
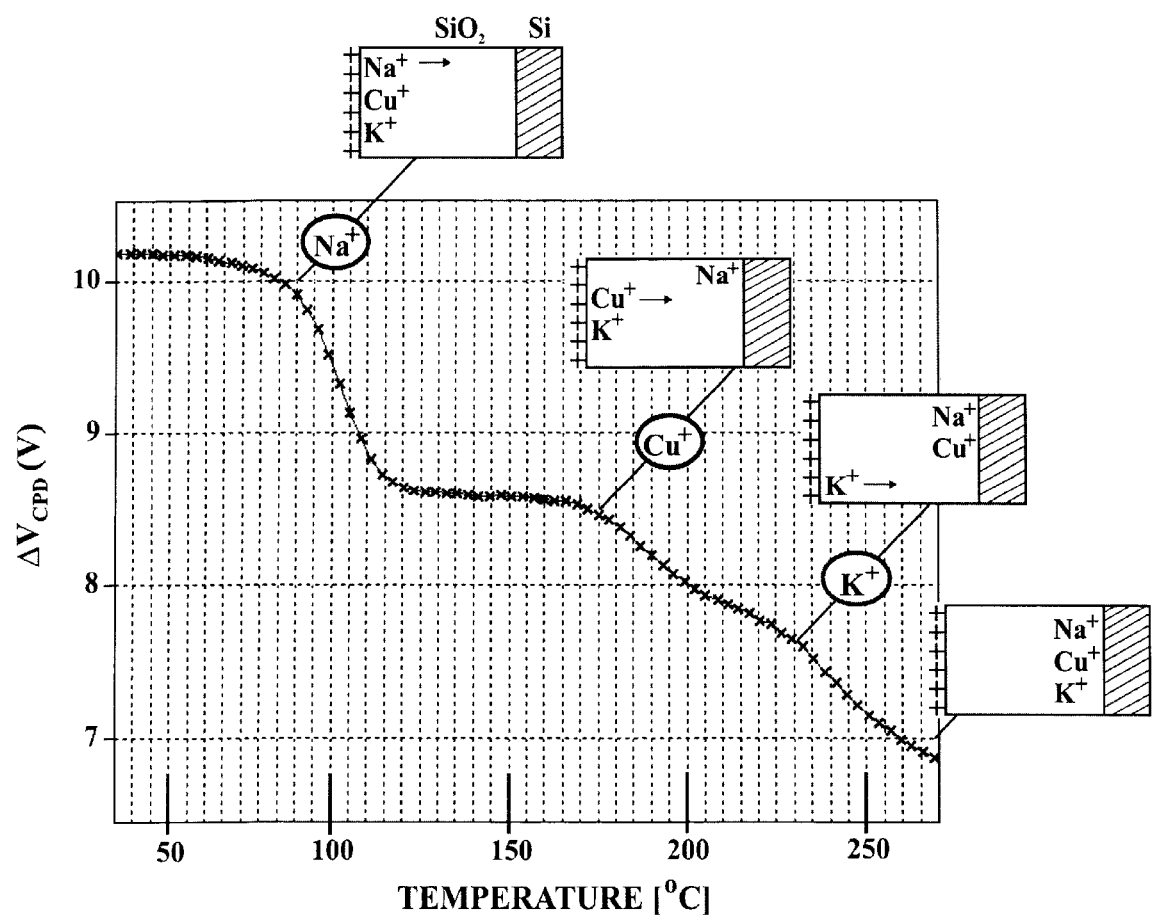
FIG. 4 is plot showing a temperature scan of the CPD of a $SiO_2$ film on a silicon substrate.

Referring to FIG. 4, a plot of $\Delta V_{CPD}$ versus temperature shows three steps in which $\Delta V_{CPD}$ decreases as the sample temperature increases. In this example, these steps occur at about 100° C., 180° C., and 240° C., respectively. These steps are due to increasing of the mobility of contaminant ions in the $SiO_2$ film as a function of temperature. At lower temperatures (e.g., less than about 70° C.), typically all ion contaminants are immobile, and remain trapped in the $SiO_2$ film despite the electric field within the film. At elevated temperatures, however, the ions become increasingly mobile and begin to drift towards the silicon substrate pushed away by the positive charge on the film surface. The specific temperature range when an ion species becomes mobile is different for different ion species. The most mobile sodium ions ($Na^+$) move at about 100° C., copper ions ($Cu^+$) move at about 180° C. and the potassium ($K^+$) ions begin to move at a temperature of about 240° C. A drift of N ions from within the $SiO_2$ film to the $SiO_2$/silicon interface causes a drop in $\Delta V_{CPD}$ corresponding to $qN/C_{ox}$, where q is the charge of each ion.

Since different ions produce voltage steps at different temperatures, they can be readily identified from a derivative spectrum, i.e., a plot of $d(\Delta V_{CPD})/dT$ versus temperature, T.

Figure 5:
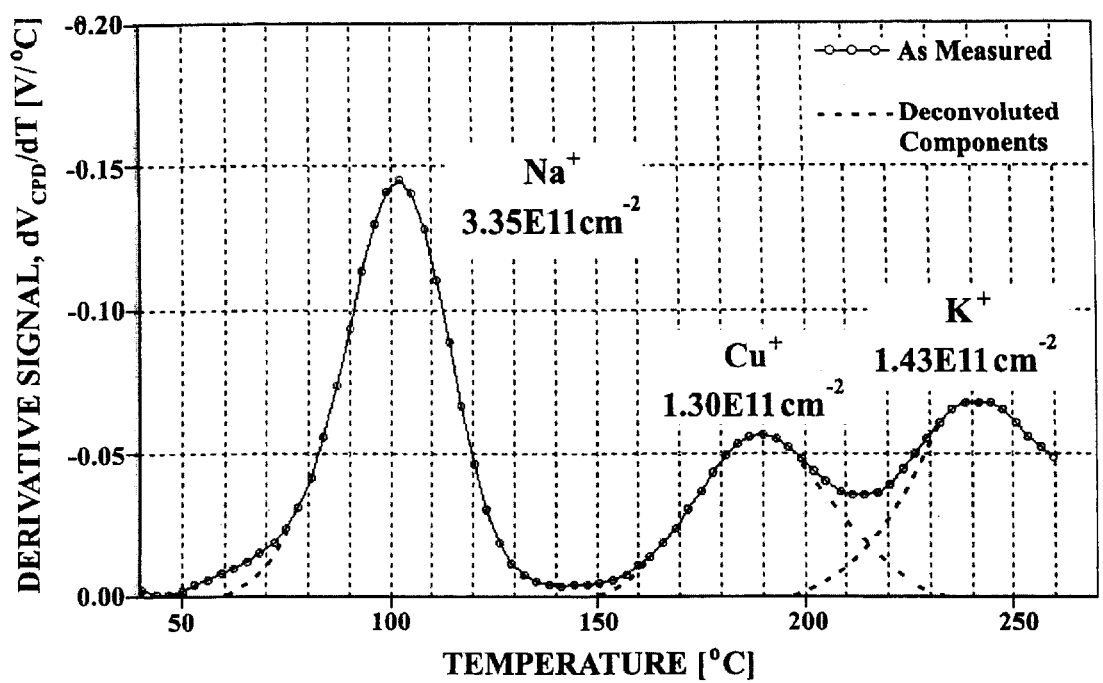
FIG. 5 is a metal ion drift spectrum corresponding to the temperature scan shown in FIG. 4.

Referring to FIG. 5, the derivative spectrum corresponding to the $\Delta V_{CPD}$ spectrum shown in FIG. 4 reveals three peaks corresponding to $Na^+$, $Cu^+$, and $K^+$. The peak temperature is used to identify the ion in each case. In this example, the peak at about 100° C. corresponds to $Na^+$ ions, the peak at 180° C. corresponds to $Cu^+$ ions, and the peak at 240° C. corresponds to $K^+$ ions. Additionally, the integrated area under each peak provides a measure of the concentration of each ion in the sample.

Figure 6:
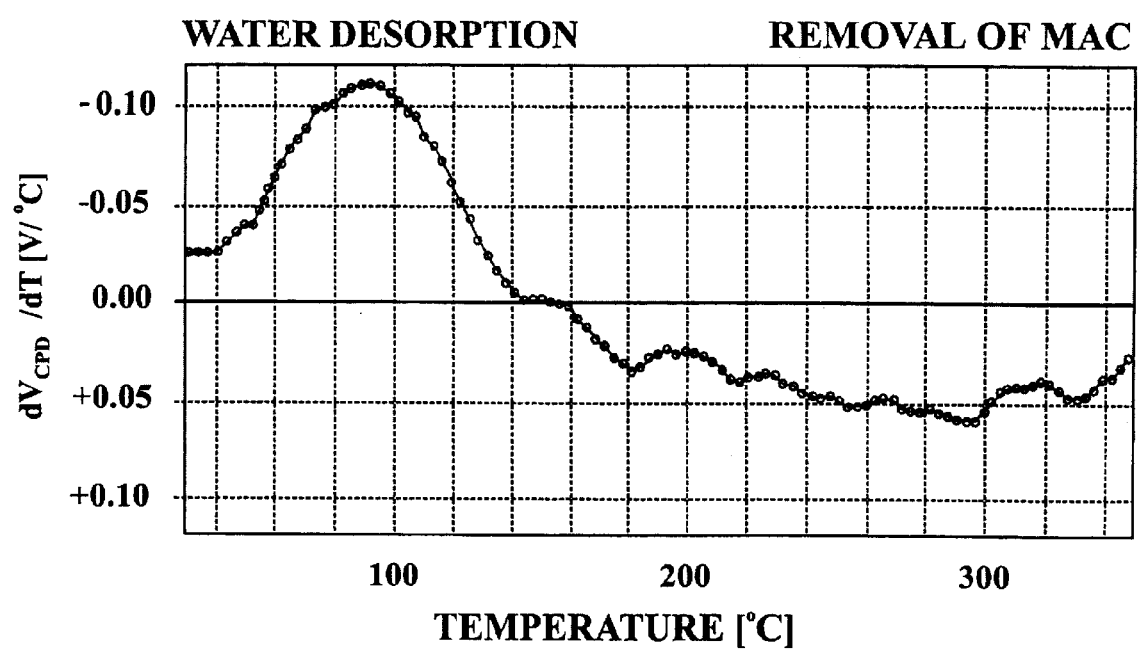
FIG. 6 is an example of derivative spectrum of a $SiO_2$ film on a silicon substrate showing.

In some embodiments, system 100 can be used to monitor the thermal desorption of polar molecules on a dielectric surface. Polar molecules (i.e., molecules having a permanent dipole moment) affect CPD measurements when adsorbed on or desorbed from a dielectric surface. Hence, CPD measurements made as a function of temperature can be used to monitor corresponding thermal desorption of polar molecules taking place in the measurement temperature range. For example, water physisorbed on $SiO_2$ desorbs at temperatures below 140° C., while organic molecules desorbs at higher temperatures (e.g., greater than 150° C.). Referring to FIG. 6, an example of a derivative desorption spectrum (i.e., $d(\Delta V_{CPD})$ versus temperature) includes a lower temperature peak at about 95° C. and a broad band of opposite sign to the peak extending from about 150° C. to above 300° C. In this example, the sample was a 20 Å thick $SiO_2$ film on a silicon substrate. The lower temperature peak corresponds to water desorption, while the higher temperature band corresponds to desorption of molecular airborne contamination. Molecular airborne contamination includes organic molecules adsorbed onto the sample surface during storage in plastic containers and/or in a clean room environment.

While application of system 100 for ion-drift spectrometry and to monitor thermal desorption of polar molecules on sample surfaces has been described, system 100 can also be used in other applications. For example, system 100 can be used in conjunction with a corona source to monitor thermal affects on stress induced leakage current. Measurement of stress induced leakage current is described in U.S. patent application Ser. No. 09/451,652, filed Nov. 30, 1999, entitled "METHOD FOR MEASURING STRESS INDUCED LEAKAGE CURRENT AND GATE DIELECTRIC INTEGRITY USING CORONA DISCHARGE," by Jacek Lagowski et al. Another example application is monitoring of charge traps in a dielectric layer that hold charge at room temperature and release charge at elevated temperatures. One could also use the described apparatus for distinguishing between various conductive processes in insulators. For example, Frenkel-Poole transport via traps is exponentially dependent on temperature, while tunneling and field emission are independent of temperature. By monitoring current vs. temperature, one can determine which transport mechanism is active and determine parameters characterizing the conduction process. This application may facilitate development of new dielectrics for microelectronics.

Furthermore, system 100 can include additional probes and/or devices to increase its functionality and capabilities. For example, a corona source can be included in system 100 to facilitate automated deposition of corona charge on the sample surface. In another example, system 100 can include a surface photovoltage (SPV) probe for monitoring a sample SPV as a function of temperature. Examples of SPV measurements are described in U.S. Pat. No. 5,663,657, entitled "DETERMINING LONG MINORITY CARRIER DIFFUSION LENGTHS," by Jacek Lagowski et al.

A number of embodiments of the invention have been described. Nevertheless, it will be understood that various modifications may be made without departing from the spirit and scope of the invention. Accordingly, other embodiments are within the scope of the following claims.

What is claimed is:

1. A method for elevated sample temperature measurement, a method comprising:

heating a sample to a sample temperature, T;

moving a probe from a first position to a second position, wherein the first position is proximate to a reference plate held at constant temperature, $T_0$, and the second position is proximate to the sample, and T is greater than $T_0$;

measuring a contact potential difference of the sample, $V_{CPDS}$, with the probe being held in the second position for a measuring time, $\Delta t_{measure}$, sufficiently short to prevent substantial heating of the probe;

returning the probe to the first position;

measuring a contact potential difference of the reference plate, $V_{CPDR}$; and determining a difference $\Delta V_{CPD} = V_{CPDS} - V_{CPDR}$ as a measure of a sample contact potential at T.

2. The method of claim 1, wherein the probe is not actively cooled while in the second position.

3. The method of claim 1 wherein $\Delta t_{measure}$ is 2 seconds or less.

4. The method of claim 1, further comprises holding the probe in the first position for a probe resting period, $\Delta t_{rest}$, of 5 seconds or more after returning the probe to the first position.

5. The method of claim 1 wherein $T_0$ is less than 30° C.

6. The method of claim 1 wherein during the measurement of $V_{CPDS}$ and $V_{CPDR}$, the temperature of the probe is kept within 2° C. of $T_0$.

7. The method of claim 1 wherein T is between $T_0$ and 500° C.

8. The method of claim 1, wherein the sample comprises a dielectric layer.

9. The method of claim 1, wherein the reference plate comprises gold or platinum.

10. The method of claim 1, further comprising cycling the probe between the first position and the second position, and during each cycle, measuring $V_{CPDS}$ in the second position and $V_{CPDR}$ in the first position; and determining a sample contact potential difference from a difference between $V_{CPDS}$ and $V_{CPDR}$ from each cycle.

11. The method of claim 10, further comprising changing the sample temperature between measuring $V_{CPDS}$ of successive cycles and measuring the sample temperature, T, each time the probe measures $V_{CPDS}$.

12. The method of claim 11, further comprising determining a dependence of $\Delta V_{CPD}$ on the sample temperature.

13. The method of claim 12, wherein a corona charge is deposited on sample surface prior to changing the sample temperature.

14. The method of claim 13, further comprising identifying contaminant ions present in the sample from the dependence of $\Delta V_{CPD}$ on the sample temperature.

15. The method of claim 14, further comprising determining the concentration of each contaminant ion in the sample from the dependence of $\Delta V_{CPD}$ on the sample temperature.

16. The method of claim 13, further comprising monitoring desorption of contaminants from the sample from a rate of change of the dependence of $\Delta V_{CPD}$ on the sample temperature.

17. A system; comprising:

a sample stage for supporting a sample;

a heating element for heating the sample to a sample temperature;

a reference;

a probe for making contact potential difference measurements mounted on a probe arm; and an electronic controller, which during operation causes the probe arm to position the probe relative the sample to measure a contact potential difference between the probe and the sample, and then causes the probe arm to position the probe relative to the reference and to measure a second contact potential difference between the probe and the reference.

18. The system of claim 17, further comprising a cooling element positioned relative the reference sample, wherein during operation the cooling element stabilizes the reference plate temperature.

19. The system of claim 17, wherein the probe is a Kelvin probe, a Monroe probe, or a Trek probe.

20. A method, comprising:

moving a probe at a first temperature from a first position to a second position, wherein the first position is proximate to a reference at the first temperature and the second position is proximate to a sample, the sample being heated to a sample temperature greater than the first temperate;

measuring a first contact potential difference of the sample with the probe in the second position;

returning the probe to the first position; and measuring a second contact potential difference of the reference;

wherein the probe is held in the second position for a period wherein the probe's temperature is substantially unchanged from the first temperature during the measuring.

* * * * *